United States Patent
Hayashi

(10) Patent No.: US 9,816,580 B2
(45) Date of Patent: Nov. 14, 2017

(54) FLUID-FILLED VIBRATION-DAMPING DEVICE

(71) Applicant: SUMITOMO RIKO COMPANY LIMITED, Komaki-Shi, Aichi (JP)

(72) Inventor: Takashi Hayashi, Kasugai (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 0 days.

(21) Appl. No.: 14/994,722

(22) Filed: Jan. 13, 2016

(65) Prior Publication Data
US 2016/0273610 A1    Sep. 22, 2016

(30) Foreign Application Priority Data

Mar. 19, 2015    (JP) .................................. 2015-056331

(51) Int. Cl.
F16F 15/02    (2006.01)
F16F 13/10    (2006.01)

(52) U.S. Cl.
CPC .................................. *F16F 13/106* (2013.01)

(58) Field of Classification Search
CPC ......... F16F 15/022; F16F 15/08; F16F 15/023
See application file for complete search history.

(56) References Cited

U.S. PATENT DOCUMENTS

| | | |
|---|---|---|
| 4,711,206 A | 12/1987 | Andra et al. |
| 4,796,876 A | 1/1989 | Sciortino |
| 5,269,498 A | 12/1993 | Bretaudeau et al. |
| 5,443,245 A | 8/1995 | Bellamy et al. |
| 7,216,857 B2 * | 5/2007 | Yamamoto ............ F16F 13/101 267/140.13 |
| 7,780,154 B2 | 8/2010 | Katagiri et al. |
| 8,556,239 B2 | 10/2013 | Okumura et al. |

(Continued)

FOREIGN PATENT DOCUMENTS

| | | |
|---|---|---|
| CN | 101925755 A | 12/2010 |
| JP | 2005-351350 A | 12/2005 |
| JP | 4861843 B2 | 1/2012 |

OTHER PUBLICATIONS

U.S. Appl. No. 14/831,107, filed Aug. 20, 2015 in the name of Yasuhiro Komiya et al.

(Continued)

*Primary Examiner* — Vishal Sahni
(74) *Attorney, Agent, or Firm* — Oliff PLC

(57) ABSTRACT

A fluid-filled vibration-damping device including two chambers partitioned by a partition member and mutually communicated by an orifice passage and a communication passage which is provided at the partition member, with a movable rubber film disposed in the communication passage so that each pressure of the chambers is applied to the respective face of the movable rubber film, wherein the movable rubber film includes a thick-walled outer peripheral retaining part formed at its outer rim and clamped by the partition member and reinforcing crosspieces projecting on its face and extending inward from the outer peripheral retaining part to mutually intersect, and a width dimension of at least one of the reinforcing crosspieces is made small in a vicinity of the intersection part to provide a narrow part by which the movable rubber film has a low-spring area in the vicinity of the intersection part.

4 Claims, 6 Drawing Sheets

(56) References Cited

U.S. PATENT DOCUMENTS

| | | | |
|---|---|---|---|
| 2003/0001639 A1* | 1/2003 | Kim | H03L 7/089 327/160 |
| 2006/0208405 A1* | 9/2006 | Muramatsu | F16F 13/105 267/140.11 |
| 2007/0222128 A1* | 9/2007 | Ichikawa | F16F 13/26 267/140.14 |
| 2008/0023897 A1* | 1/2008 | Muraoka | F16F 13/26 267/140.11 |
| 2009/0140477 A1* | 6/2009 | Michiyama | F16F 13/106 267/121 |
| 2010/0201053 A1* | 8/2010 | Okumura | F16F 13/106 267/140.13 |
| 2015/0069686 A1* | 3/2015 | Okumura | F16F 13/08 267/140.13 |

OTHER PUBLICATIONS

May 16, 2016 Office Action issued in U.S Appl. No. 14/831,107.
Aug. 7, 2017 Office Action issued in Chinese Patent Application No. 201610140928.9.

* cited by examiner

FLUID-FILLED VIBRATION-DAMPING DEVICE

INCORPORATED BY REFERENCE

The disclosure of Japanese Patent Application No. 2015-056331 filed on Mar. 19, 2015 including the specification, drawings and abstract is incorporated herein by reference in its entirety.

BACKGROUND OF THE INVENTION

1. Field of the Invention

The present invention relates to a fluid-filled vibration-damping device used for an engine mount of an automobile or the like.

2. Description of the Related Art

A vibration-damping device has been known as a kind of device such as a vibration-damping connecting body or a vibration-damping support body to be interposed between members constituting a vibration transmission system to connect the members to each other in a vibration-damping manner. Additionally, as disclosed in U.S. Pat. No. 8,556,239, a fluid-filled vibration-damping device is proposed as a vibration-damping device to obtain high vibration-damping performance owing to the flowing action of a fluid sealed inside. This fluid-filled vibration-damping device comprises a first mounting member, a second mounting member, a main rubber elastic body elastically connecting them to each other, a partition member supported by the second mounting member, a pressure-receiving chamber and an equilibrium chamber which are defined to both sides of the partition member with a non-compressible fluid sealed therein, and an orifice passage communicating the pressure-receiving chamber and the equilibrium chamber with each other. A vibration input between the first mounting member and the second mounting member causes relative pressure fluctuation therebetween, thereby generating a fluid flow through the orifice passage, so that the vibration-damping effect is exerted based on the resonance action of the fluid.

The fluid-filled vibration-damping device exerts excellent vibration-damping effect based on the flow action of the fluid upon input of a vibration to whose frequency the orifice passage is tuned in advance. On the other hand, upon input of a vibration in a higher frequency range than the tuning frequency of the orifice passage, the device suffers from a deterioration of vibration-damping performance (vibration insulating action) caused by antiresonance of the orifice passage.

Some documents including U.S. Pat. No. 8,556,239 disclose a fluid-filled vibration-damping device further comprising a communication passage provided at the partition member to communicate the pressure-receiving chamber and the equilibrium chamber with each other, with a movable rubber film being disposed in the communication passage such that a liquid pressure of each of the pressure-receiving chamber and the equilibrium chamber is applied on the respective face of the movable rubber film. According to this, upon input of an idling vibration or the like with a higher frequency and a smaller amplitude than the tuning frequency of the orifice passage, which is set to a low frequency corresponding to an engine shake, the movable rubber film is elastically deformed to generate a substantial fluid flow between the pressure-receiving chamber and the equilibrium chamber via the communication passage. This ensures absorption or moderation of the inner pressure fluctuation of the pressure-receiving chamber, so that the vibration insulating effect owing to lower dynamic spring is exerted. Upon input of a low-frequency large-amplitude vibration to which the orifice passage is tuned, elastic deformation of the movable rubber film cannot follow it completely, thereby causing a fluid flow via the orifice passage to favorably exhibit the vibration-damping effect based on the flow action of the fluid.

It is also possible to assertively use the substantial fluid flow between the pressure-receiving chamber and the equilibrium chamber through the communication passage caused by elastic deformation of the movable rubber film to improve the vibration-damping performance for a vibration in a higher frequency range than an idling vibration. Specifically, it is possible to generate a fluid flow via the communication passage accompanying elastic deformation of the movable rubber film in a resonance state, upon input of a vibration in a middle to high frequency range of approximately 50 to 100 Hz generally corresponding to the driving rumble for example, thereby assertively improving the vibration insulating performance owing to lower dynamic spring based on the resonance action of the flowing fluid.

Incidentally, in order to more advantageously obtain the above-described low dynamic spring action owing to elastic deformation of the movable rubber film upon a middle-frequency middle-amplitude vibration like an idling vibration of an automobile, it is desirable that the thin-walled part of the movable rubber film allowed to elastically deform have a large area. In other words, in the structure of the device according to U.S. Pat. No. 8,556,239, the sizes of the retaining parts at the center and the outer rim to be clamped by the partition member and the sizes of the reinforcing crosspieces extending in a radial fashion as connecting the retaining parts may be reduced in a plan view for example, to increase the area of the thin-walled film part. The resultant movable rubber film is more likely to exhibit the pressure absorbing action owing to its deformation, favorably obtaining the vibration-damping effect by lower dynamic spring.

However, simply increasing the area of the thin-walled film part of the movable rubber film by the means of using reinforcing crosspieces with small width dimensions or reducing the diameter of the outer peripheral retaining part etc., leads to a lower dynamic spring in the whole of the movable rubber film. This may damage the vibration-damping ability owing to the orifice passage in relation to a low-frequency large-amplitude vibration. In addition, a fluid flow via the communication passage accompanies the displacement of the movable rubber film, leading to a problem of higher dynamic spring due to antiresonance of the fluid flow in relation to the vibration in a higher frequency range of approximately 100 to 200 Hz like a high-speed driving rumbling or an acceleration driving rumble of an automobile etc., which may deteriorate the vibration-damping performance.

SUMMARY OF THE INVENTION

It is therefore one object of the present invention to provide a fluid-filled vibration-damping device of novel structure which is able to exhibit excellent vibration-damping effect even upon input of a vibration with a higher frequency than the resonance frequency of the orifice passage.

The above and/or optional objects of this invention may be attained according to at least one of the following modes of the invention. The following modes and/or elements employed in each mode of the invention may be adopted at any possible optional combinations.

As a result of extensive studies and experiments, the inventor of this invention has reached the following findings. Namely, increasing the size of the thin-walled part of the movable rubber film allowed to elastically deform, the thin-walled part undergoes elastic deformation in a wide range upon input of a vibration of the frequency to which the communication passage is tuned. This deformation of the thin-walled part causes a piston action to be exerted excellently, thereby increase the amount of the fluid flowing via the communication passage. As a result, upon input of a vibration in a frequency range to which the communication passage is tuned, the liquid pressure absorbing action is effectively exerted owing to the resonance phenomenon. On the other hand, upon input of a vibration with a higher frequency than the tuning frequency of the communication passage, higher dynamic spring due to antiresonance of the communication passage may be highly caused. In light of the findings, the inventor further studied for a structure which enough allows the movable rubber film to deform upon input of a middle-frequency middle-amplitude vibration and which is able to control the fluid flow through the communication passage in a higher frequency range for the purpose of restricting higher dynamic spring due to antiresonance of the communication passage, to reach the present invention.

A first mode of the present invention provides a fluid-filled vibration-damping device comprising: a first mounting member; a second mounting member; a main rubber elastic body elastically connecting the first mounting member and the second mounting member; a partition member supported by the second mounting member; a pressure-receiving chamber whose wall is partially constituted by the main rubber elastic body and disposed on a first side of the partition member; an equilibrium chamber whose wall is partially constituted by a flexible film and disposed on a second side of the partition member; a non-compressible fluid sealed in the pressure-receiving chamber and the equilibrium chamber; an orifice passage communicating the pressure-receiving chamber and the equilibrium chamber with each other; a communication passage provided at the partition member to communicate the pressure-receiving chamber and the equilibrium chamber with each other; and a movable rubber film being disposed in the communication passage so that a pressure of the pressure-receiving chamber is applied to a first face of the movable rubber film and a pressure of the equilibrium chamber is applied to a second face of the movable rubber film, wherein the movable rubber film includes a thick walled outer peripheral retaining part formed at its outer rim and clamped by the partition member and a plurality of reinforcing crosspieces projecting on its face and extending inward from the outer peripheral retaining part, and the plurality of reinforcing crosspieces mutually intersect to provide an intersection part, and a width dimension of at least one of the reinforcing crosspieces is made small in a vicinity of the intersection part so as to provide a narrow part so that the movable rubber film has a low-spring area in the vicinity of the intersection part of the reinforcing crosspieces by the narrow part.

In the fluid-filled vibration-damping device constituted according to the first mode, upon a low-frequency large-amplitude vibration input, the movable rubber film obstructs the communication passage, efficiently generating a fluid flow between the pressure-receiving chamber and the equilibrium chamber through the orifice passage to effectively exert the vibration-damping effect by the fluid flow action.

Especially, the movable rubber film is provided with the thick-walled reinforcing crosspieces to limit the deformation amount of the movable rubber film, thereby effectively inducing the relative pressure fluctuation between the pressure-receiving chamber and the equilibrium chamber. As a result, the amount of the fluid flowing through the orifice passage is easily secured.

Besides, although the orifice passage is substantially cut off owing to antiresonance upon a vibration input with a middle to high frequency, elastic deformation of the movable rubber film exhibits the liquid pressure absorbing action to avoid higher dynamic spring. As a result, the vibration insulating effect is exerted by low dynamic spring, thereby obtaining the vibration-damping function as a target.

Moreover, the resonance frequency of the flowing fluid for the communication passage (the tuning frequency of the communication passage) is set to a high frequency to keep the communication passage in a communication state upon input of a high-frequency small-amplitude vibration. Accordingly, a high-frequency small-amplitude vibration input causes the resonance of the fluid flowing through the communication passage to exert excellent vibration-damping effect, while an input of a vibration with a higher frequency than the tuning frequency of the communication passage leads to a problem of higher dynamic spring due to antiresonance. Here, for the movable rubber film of the fluid-filled vibration-damping device according to this mode, the narrow part is formed in the vicinity of the intersection part of the reinforcing crosspieces and the low-spring area is locally provided owing to the narrow part. This makes the low-spring area deform elastically and assertively in the vicinity of the intersection part of the reinforcing crosspieces where the narrow part is provided, upon input of a high-frequency small-amplitude vibration, thereby limiting a piston action relative to a case of the whole movable rubber film deforming, to limit the amount of the fluid flowing through the communication passage. As a result, higher dynamic spring due to antiresonance of the communication passage is decreased, enabling to keep dynamic spring low to effectively obtain the vibration insulating effect owing to low dynamic spring in a wide range of high frequency.

Upon input of a middle-frequency middle-amplitude vibration where enough lower dynamic spring is difficult to obtain only by deformation of the low-spring area, a wide range of film part of the movable rubber film out of the reinforcing crosspieces deforms elastically to effectively exhibit the vibration insulating effect owing to lower dynamic spring.

Also, by providing the narrow part in the vicinity of the intersection part of the plurality of reinforcing crosspieces where the reinforcing effect is large, it is easy to prevent the spring of the movable rubber film from being excessively small in the part where the narrow part is formed, and tune the spring characteristics of the low-spring area. Additionally, in the part where the plurality of reinforcing crosspieces disposed mutually and greatly separate and the reinforcing effect is small, excessive deformation of the movable rubber film is limited by the parts with relatively large width dimensions of the reinforcing crosspieces. This induces the relative pressure fluctuation enough between the pressure-receiving chamber and the equilibrium chamber upon a low-frequency large-amplitude vibration input, enabling to effectively obtain the vibration-damping effect exerted by the fluid flowing through the orifice passage. Moreover, since the narrow part is provided for the reinforcing crosspieces in part, the low-spring area is provided only locally.

Accordingly, it matters little that the liquid pressure escapes from the pressure-receiving chamber to the equilibrium chamber due to deformation of the low-spring area and the target vibration-damping effect is effectively exerted.

A second mode of the present invention provides the fluid-filled vibration-damping device according to the first mode, wherein the movable rubber film further includes a thick walled center retaining part, while the plurality of reinforcing crosspieces connect the center retaining part and the outer peripheral retaining part to each other so that the plurality of reinforcing crosspieces intersect together at the center retaining part as the intersection part, and each of the reinforcing crosspieces has the narrow part at end portion thereof on a side of the center retaining part.

According to the second mode, the movable rubber film is supported by the partition member not only at the periphery on the outer peripheral retaining part, but also at the center on the center retaining part. This makes it easier to limit deformation of the movable rubber film, thereby further advantageously avoid the liquid pressure absorbing action of the movable rubber film from deteriorating the vibration-damping effect owing to the flow action of the fluid through the orifice passage. Besides, the reinforcing crosspieces is provided such that they connect the outer peripheral retaining part to the center retaining part and the reinforcing crosspieces are supported at both of their inner peripheral edges and outer peripheral edges. This makes the lengths of the reinforcing crosspieces short relative to a case where the reinforcing crosspieces extend continuously all the radial length of the movable rubber film etc., while making the reinforcing crosspieces have in a both-ends-supported structure with both edges supported. As a result, deformation of the reinforcing crosspieces is favorably limited, enabling to exert excellent reinforcing action by the reinforcing crosspieces.

Moreover, the narrow parts are formed on the end portions of the reinforcing crosspieces on the sides of the center retaining part to provide the low-spring area at the center of the movable rubber film separate from the outer peripheral retaining part, thereby avoiding the low-spring area from being restrained by the outer peripheral retaining part on a high frequency vibration input to effectively exert the vibration-damping effect owing to lower dynamic spring. Favorably, by the means of making the thickness of the center retaining part smaller than that of the outer peripheral retaining part or the like, the center retaining part is made to deform more easily than the outer peripheral retaining part, thereby realize lower dynamic spring upon a high frequency vibration input more advantageously.

A third mode of the present invention provides the fluid-filled vibration-damping device according to the second mode, wherein each of the reinforcing crosspieces extends with a straight line shape, and the plurality of reinforcing crosspieces extend outward from the center retaining part in a radial fashion to connect to the outer peripheral retaining part.

According to the third mode, the reinforcing crosspieces each extend with a straight line shape and they are disposed in a radial fashion. Consequently, the thin-walled parts formed peripherally between the plurality of reinforcing crosspieces each have a shape with the peripheral length gradually increasing toward the outer periphery. By providing the narrow parts in the vicinity of the center retaining part where the plurality of reinforcing crosspieces center to exhibit high reinforcing effect, when a high frequency vibration is input, the movable rubber film is preferentially deformed in the low-spring area provided at the center separate from the outer peripheral retaining part, while the deformation amount of the movable rubber film can be prevented from being excessive in the low-spring area, enabling to attain the vibration-damping effect owing to liquid pressure absorption across a wide range of high frequency.

Moreover, at the periphery with a large peripheral length, the plurality of reinforcing crosspieces are disposed peripherally and greatly separate and the reinforcing effect for the movable rubber film by the reinforcing crosspieces is small. As a result, upon a middle-frequency middle-amplitude vibration input, deformation of the movable rubber film is allowed enough to exhibit the vibration-damping effect as the target effectively. Especially, since the reinforcing effect by the reinforcing crosspieces is made small in the periphery of the movable rubber film constrained by the outer peripheral retaining part, the movable rubber film is easily and elastically deformable in a wide range including the periphery.

A fourth mode of the present invention provides the fluid-filled vibration-damping device according to any one of the first through third modes, wherein the reinforcing crosspieces gradually reduce their widths inward from the outer peripheral retaining part.

According to the fourth mode, the width dimensions of the reinforcing crosspieces are made large at the periphery where the peripheral length of the movable rubber film is large, thereby allowing the reinforcing crosspieces to exhibit the reinforcing effect enough. Furthermore, the widths of the reinforcing crosspieces are gradually decreased toward inside where the peripheral length of the movable rubber film is small, thereby avoiding excessive reinforcing effect by the reinforcing crosspieces at the center of the movable rubber film separate from the outer peripheral retaining part to effectively exert the low dynamic spring action owing to deformation of the movable rubber film.

A fifth mode of the present invention provides the fluid-filled vibration-damping device according to any one of the first through fourth modes, wherein a gap is formed between a projecting edge face of each of the reinforcing crosspieces from the movable rubber film and the partition member.

According to the fifth mode, the part of the movable rubber film where the reinforcing crosspieces are formed is allowed to deform to a certain extent without being restrained by the partition member beyond need, thereby obtaining more excellent vibration-damping effect upon a middle-frequency middle-amplitude vibration input. In addition, adjustment of the gap between the reinforcing crosspieces and the partition member enables to enough allow the movable rubber film to deform upon a middle-frequency middle-amplitude vibration input while restricting the deformation amount of the movable rubber film by abutment of the reinforcing crosspieces and the partition member to control escaping of the liquid pressure upon a low-frequency large-amplitude vibration input. Therefore, the vibration-damping effect is effectively obtained upon input of the plural kinds of vibrations with various frequencies and amplitudes.

Provided with the narrow parts formed partially in the reinforcing crosspieces of the movable rubber film to provide the low-spring area, the present invention exhibits the vibration insulating effect upon a high-frequency small-amplitude vibration input owing to lower dynamic spring by the low-spring area deforming assertively. In addition, the amount of the fluid flowing through the communication passage is limited by deformation of the low-spring area provided locally to control higher dynamic spring due to antiresonance, whereby the device can attain the target vibration insulating effect even upon input of a higher frequency vibration than the tuning frequency of the communication passage. Upon a middle-frequency middle-amplitude vibration input, not only the low-spring area but a wide range of the movable rubber film deforms to exert the vibration-damping effect based on lower dynamic spring by the liquid pressure absorption. Additionally, upon a low-frequency large-amplitude vibration input, the movable rubber film being reinforced by the reinforcing crosspieces obstructs the communication passage to effectively generate the fluid flow via the orifice passage, thereby exhibiting the vibration-damping effect based on the fluid flow action.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
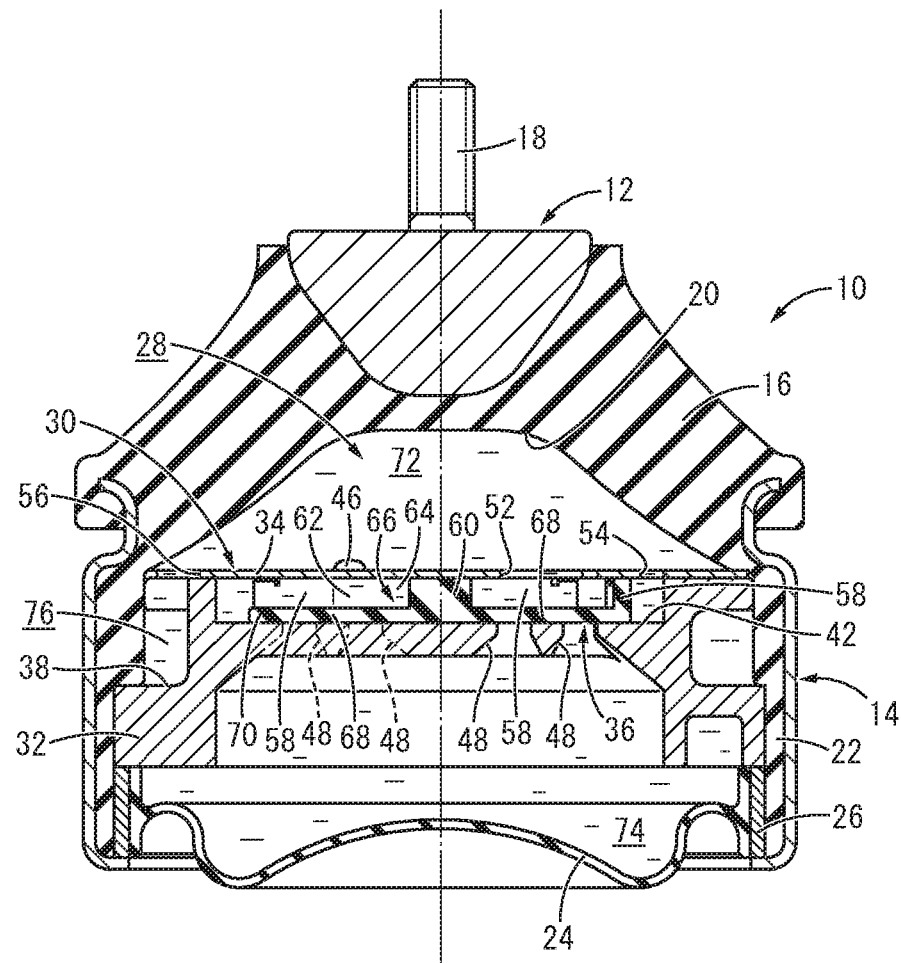
FIG. 1 is a vertical cross sectional view showing a fluid-filled vibration-damping device in the form of an engine mount as a first embodiment of the present invention, taken along line 1-1 of FIG. 2.

There will be described the embodiments of the present invention referring to the drawings.

FIG. 1 shows an engine mount 10 for an automobile as a first embodiment of a fluid-filled vibration-damping device in a structure according to the present invention. The engine mount 10 comprises a first mounting member 12, a second mounting member 14 and a main rubber elastic body 16 connecting them to each other elastically. In the descriptions hereafter, the vertical direction means the vertical direction in FIG. 1 as long as there is no special explanation.

In more detail, the first mounting member 12 is a member of high rigidity formed of iron, aluminum alloy or the like. The first mounting member 12 has a round block shape or an inverted substantially frustoconical shape, and is provided with a fixing bolt 18 projecting upward on its central axis.

The second mounting member 14 is a high rigidity member as well as the first mounting member 12, having a substantially circular hollow-cylinder shape with a thin wall and a large diameter as a whole. The second mounting member 14 has a smaller diameter in the upper portion than in the lower portion in a stepped way.

The first mounting member 12 is disposed above in relation to the second mounting member 14 on the same central axis and the first mounting member 12 and the second mounting member 14 is elastically connected to each other by the main rubber elastic body 16. The main rubber elastic body 16 has a shape of a thick-walled, large-diameter substantially truncated cone, wherein the edge part on the small-diameter side is bonded by vulcanization to the first mounting member 12 while the edge part on the large-diameter side is bonded by vulcanization to the upper end of the second mounting member 14. In this way, the main rubber elastic body 16 takes the form of an integrally vulcanization molded component incorporating the first mounting member 12 and the second mounting member 14.

Besides, the main rubber elastic body 16 is provided with a large-diameter recess 20. The large-diameter recess 20 is a concavity in an inverted substantially conical shape, opening to the edge face on the large-diameter side of the main rubber elastic body 16. Therefore, the main rubber elastic body 16 has a vertical cross sectional shape extending diagonally such that it expands downward between the first mounting member 12 and the second mounting member 14.

In addition, the main rubber elastic body 16 is integrally formed with a sealing rubber layer 22. The sealing rubber layer 22 has a shape of a large-diameter substantially circular hollow-cylinder projecting downward on the outer peripheral side of the opening part of the large-diameter recess 20. The sealing rubber layer 22 is bonded to the inner peripheral face of the large-diameter portion of the second mounting member 14 so as to cover it. In the sealing rubber layer 22 of the present embodiment, the outer diameter dimension is substantially equal in the upper portion and in the lower portion, while the inner diameter dimension is larger in the lower portion than in the upper portion. It means that the lower portion is thinner than the upper portion and the inner peripheral face of the sealing rubber layer 22 has a stepped shape.

Furthermore, a flexible film 24 is attached to the integrally vulcanization molded component of the main rubber elastic body 16. The flexible film 24 is a rubber film in a shape of a thin-walled large-diameter substantially circular disc as a whole. The flexible film 24 has ample slack in the vertical direction to be easily deformable. Additionally, a fixing member 26 is bonded by vulcanization to the flexible film 24. The fixing member 26 is a high rigidity metal member in a large-diameter substantially circular hollow-cylinder shape, which is bonded by vulcanization to the outer peripheral face of the flexible film 24. The flexible film 24 is inserted into the lower end opening part of the second mounting member 14 and the fixing member 26 is fastened fitting with the lower end of the second mounting member 14, whereby the flexible film 24 is attached to the second mounting member 14. In the present embodiment, after the fixing member 26 is fastened fitting with the second mounting member 14, the lower end of the second mounting member 14 is bended to the inner peripheral side by rolling caulking or the like to be overlapped with the lower face of the fixing member 26, avoiding the fixing member 26 from escaping downward from the second mounting member 14.

By attaching the flexible film 24 to the integrally vulcanization molded component of the main rubber elastic body 16 this way, the upper side opening part of the second mounting member 14 is closed by the main rubber elastic body 16, while the lower side opening part of the second mounting member 14 is closed by the flexible film 24. This defines a fluid chamber 28 which is separated from the outer space in a fluid tight manner, between the opposite faces of the main rubber elastic body 16 and the flexible film 24, with a non-compressible fluid sealed in the fluid chamber 28. The non-compressible fluid sealed in the fluid chamber 28 is not especially limited. For example, employed are liquids such as water, ethylene glycol, alkylene glycol, polyalkylene glycol, silicone oil, and mixtures of them, more preferably a low-viscosity fluid having viscosity of 0.1 Pa·s or lower.

Figure 2:
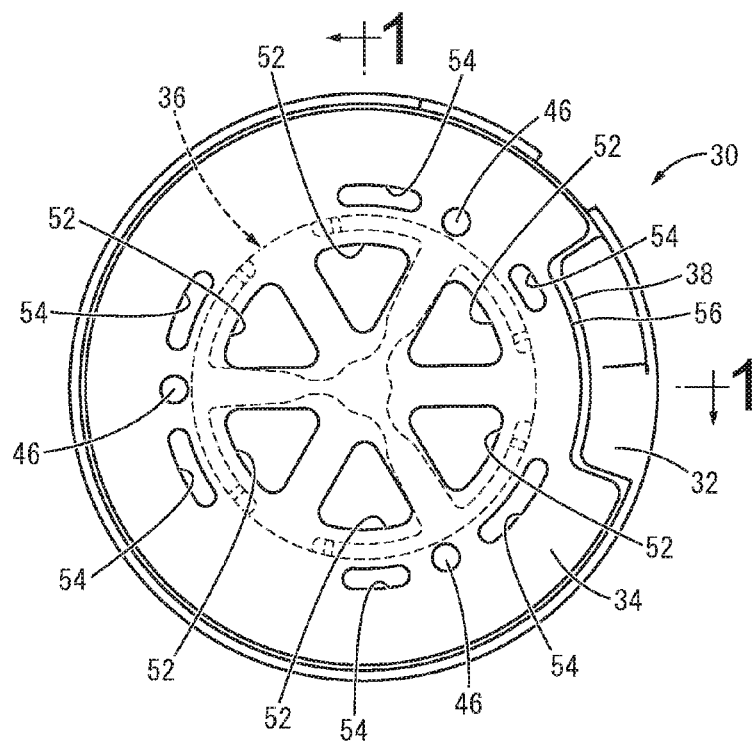
FIG. 2 is a plan view of a partition member of the engine mount shown in FIG. 1.

In this fluid chamber 28, a partition member 30 as shown in FIG. 2 is disposed. As shown in FIGS. 1 and 2, the partition member 30 comprises a partition member main body 32 and a lid plate member 34, which are combined, with a movable rubber film 36 being assembled between them.

The partition member main body 32 is a hard member formed of a synthetic resin, a metal, or the like, having a shape of an inverted substantially bottomed circular hollow-cylinder as a whole. In the outer peripheral edge of the partition member main body 32 in a substantially circular hollow-cylinder, a circumferential groove 38 is formed to open to the outer peripheral face and extend continuously with a prescribed length in the circumferential direction. In one end of the circumferential groove 38 in the circumferential direction, the upper face of the lower wall portion is in a sloped shape which is gradually inclined upward toward outside in the length direction, and the one end opens to the upper face of the partition member main body 32. On the other hand, in the other end of the circumferential groove 38 in the circumferential direction, a lower opening part, which is not shown, is formed through the lower wall portion, whereby this end opens to the lower face of the partition member main body 32.

Figure 3:
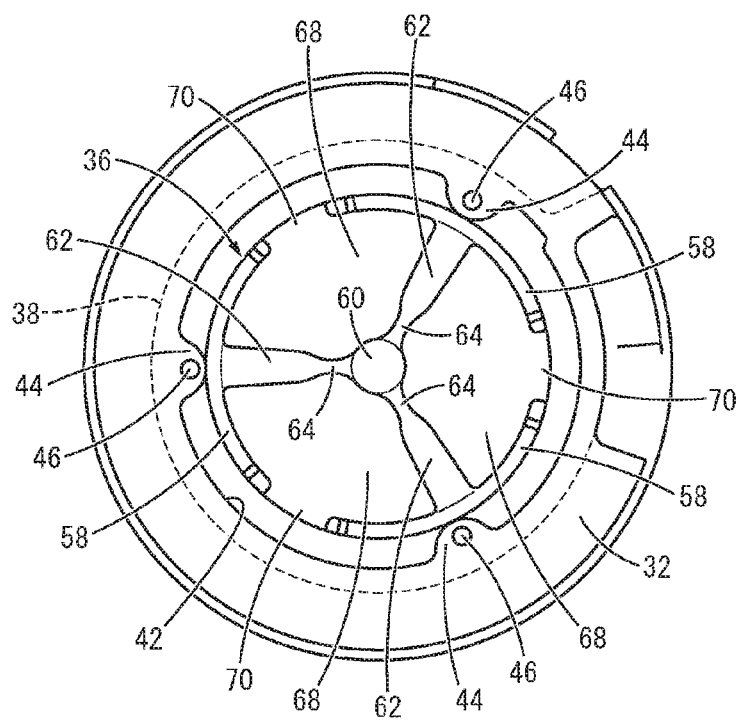
FIG. 3 is a plan view showing a state of a partition member main body of the partition member shown in FIG. 2 being provided with a movable rubber film.

Additionally, in the center of the partition member main body 32 in the diametric direction, a housing recess 42 is provided opening to the upper face as shown in FIGS. 1 and 3. The housing recess 42 is a concavity with a substantially circular transverse cross section shape and a prescribed depth in the vertical direction. At a plurality of locations on the peripheral wall part, abutting protrusions 44, which have a cross section in a form of a substantially semicircle projecting to the inner peripheral side, are provided to protrude inward in the diametric direction. Furthermore, on each abutting protrusion 44, a locking projection 46 is formed to project upward.

Besides, on the bottom wall part of the housing recess 42, lower through holes 48 are formed therethrough as a communication passage. The specific shape, positioning, number, size, or the like of the lower through holes 48 are not especially limited. In the present embodiment, a plurality of lower through holes 48 are dispersedly formed.

On the other hand, the lid plate member 34 is a hard member as well as the partition member main body 32, in a shape of a substantially circular disc with a thin wall and a large diameter as shown in FIGS. 1 and 2. It has a plurality (six in this embodiment) of upper through holes 52 formed by piercing in the thickness direction through its inner peripheral portion in the radial direction, as shown in FIG. 2. In addition, on the peripheral outside of the upper through holes 52 of the lid plate member 34, on the respective position corresponding to each locking projection 46 of the partition member main body 32, a locking hole, which is not shown, is formed through the lid plate member 34 in the thickness direction. On both sides of the locking holes in the peripheral direction, relief holes 54 are formed by piercing in the thickness direction to each extend peripherally. Moreover, on the outer peripheral edge of the lid plate member 34, an upper opening part 56 is formed through a peripheral part in the thickness direction such that the lid plate member 34 is cut out in part.

The lid plate member 34 is overlapped with the partition member main body 32 from above, with each locking projection 46 of the partition member main body 32 being inserted into the respective corresponding locking hole of the lid plate member 34. After that, the distal ends of the locking projections 46 is squelched to expand their diameters, whereby they are locked to the peripheral parts of the openings of the locking holes in the vertical direction, fixing the partition member main body 32 and the lid plate member 34 to each other. The partition member main body 32 and the lid plate member 34 can be configured to be positioned relative to each other in the circumference direction by appropriate means. One example of the means for so doing is disposing unequally on the periphery three locking projections 46, 46, 46, which are formed on the peripheral wall part of the housing recess 42, and three locking holes corresponding to them. Another example is differentiating shapes in a plural sets of the locking projection 46 and the locking hole from each other.

Additionally, by the partition member main body 32 and the lid plate member 34 being fixed to each other, the lid plate member 34 covers the opening of the housing recess 42. The upper through holes 52 and the relief holes 54 of the lid plate member 34 are provided in a part of the lid plate member 34 which covers the opening of the housing recess 42 so as to be in communication with the housing recess 42.

Figure 4:
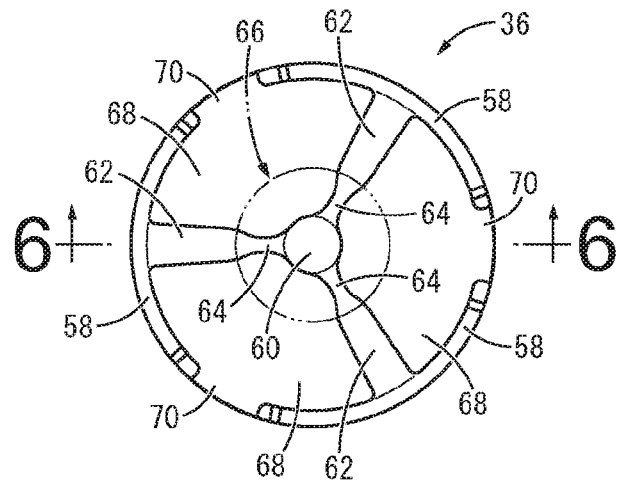
FIG. 4 is a plan view of the movable rubber film of the engine mount shown in FIG. 1.
Figure 5:
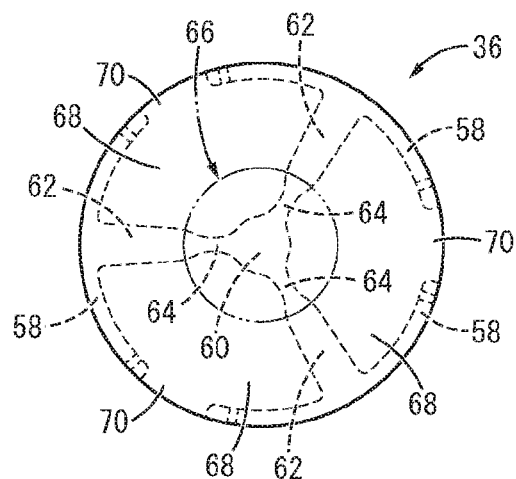
FIG. 5 is a bottom view of the movable rubber film shown in FIG. 4.
Figure 6:
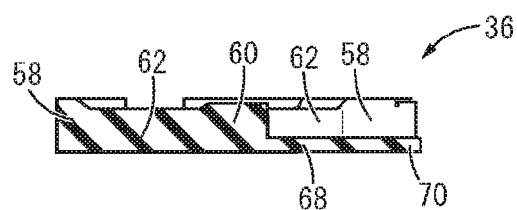
FIG. 6 is a cross sectional view taken along line 6-6 of FIG. 4.

Besides, in the housing recess 42 of the partition member main body 32, the movable rubber film 36 is disposed as shown in FIG. 3. The movable rubber film 36 has a substantially circular disc shape as a whole as shown in FIGS. 4 to 6, and it is formed of a rubber elastic body, a resin elastomer or the like, for example. On the outer rim of the movable rubber film 36, outer peripheral retaining parts 58, which project upward to be thick walled, are integrally formed extending in the peripheral direction. The outer peripheral retaining parts 58 are disposed on three locations on the periphery. Additionally, at the radial center of the movable rubber film 36, a center retaining part 60 is integrally formed substantially in a form of a small-diameter cylinder. By the center retaining part 60 being provided projecting upward, a part of the movable rubber film 36 where the center retaining part 60 is formed is made partially thick. In this embodiment, the center retaining part 60 is made thinner in the vertical direction than the outer peripheral retaining parts 58 and the upper face of the center retaining part 60 positions slightly lower than the upper faces of the outer peripheral retaining parts 58.

Moreover, the movable rubber film 36 includes reinforcing crosspieces 62. The reinforcing crosspieces 62 are made thicker than elastic film parts 68, which will be described later, projecting upward each in a straight line shape extending radially inward from the outer peripheral retaining part 58 to connect to the center retaining part 60 at its inner edge. In short, the reinforcing crosspieces 62 extend from the center retaining part 60 to the outer peripheral retaining parts 58 in a radial fashion such that they connect the outer peripheral retaining parts 58 and the center retaining part 60 to each other in the radial direction. Three reinforcing crosspieces 62 are disposed at equal intervals in the circumference direction, each connect the respective outer peripheral retaining part 58 to the center retaining part 60. In other words, each outer peripheral retaining part 58 is integrally formed to extend from the outer peripheral end of the respective reinforcing crosspiece 62 to both sides in the circumference direction.

Furthermore, the reinforcing crosspieces 62 gradually reduce their widths from the outer peripheral retaining parts 58 to the center retaining part 60. The thicknesses of the reinforcing crosspieces 62 are smaller than those of the outer peripheral retaining parts 58 and the center retaining part 60 in the vertical direction. The upper faces of the reinforcing crosspieces are in lower positions than those of the retaining parts 58, 60. In addition, the upper faces of the reinforcing crosspieces 62 are inclined at both ends in the length direction to be smoothly continuous to each the upper faces of the outer peripheral retaining parts 58 and the center retaining part 60.

Besides, the three reinforcing crosspieces 62, 62, 62 all connect to the center retaining part 60 at their inner ends, thereby intersecting at the center retaining part 60. In the vicinity of this center retaining part 60 as the intersection part, narrow parts 64 are provided in the reinforcing crosspieces 62. The narrow parts 64 are provided in the vicinity of the end portions of the reinforcing crosspieces 62 on the side of the center retaining part 60 with both side faces thereof in the width direction having shapes curved concavely when seen in the axial direction, thereby making the width dimensions of the reinforcing crosspieces 62 smaller partially. In the present embodiment, both side faces of the narrow parts 64 are continuous smoothly to both side faces of the part out of the narrow parts 64. The width dimensions of the narrow parts 64 change consecutively in the length direction of the reinforcing crosspieces 62 while changing with a larger change rate at least at both end portions of the narrow parts 64 than in the parts out of the narrow parts 64. In this present embodiment, the width dimensions of the narrow parts 64 are not constant in the length direction, but change as gradually decreasing toward the center in the length direction. Alternatively, the width dimensions of the narrow parts 64 can be substantially constant, across the whole in the length direction or a part, for example.

The narrow parts 64 are provided at all inner end portions of the three reinforcing crosspieces 62, 62, 62. By the narrow parts 64, the movable rubber film 36 is provided at the center with a low-spring area 66 where the reinforcing effect of the reinforcing crosspieces 62 is deteriorated, which makes the dynamic spring constant in the thickness direction locally small. In the present embodiment, the narrow parts 64, 64, 64 are formed in the vicinity of the center retaining part 60 as the intersection part of the three reinforcing crosspieces 62, 62, 62. As a result, the low-spring area 66 is provided in the vicinity of the center retaining part 60, i.e. at the center of the movable rubber film 36 including the center retaining part 60. Although the range of the low-spring area 66 is not clearly defined in the movable rubber film 36 actually, the range is imaginarily shown by a two-dot chain line in FIG. 4 for the sake of easy understanding.

Between the reinforcing crosspieces 62, 62 mutually adjacent in the circumferential direction of the movable rubber film 36, a thin elastic film part 68 is integrally formed, being surrounded by the reinforcing crosspieces 62, 62 and the outer peripheral retaining parts 58, 58 and the center retaining part 60 as viewed in the axial direction. Each elastic film part 68 includes a relief film part 70 at the outer peripheral edge. The relief film part 70 is in a form of a thin film easily and elastically deformable in the thickness direction. The relief film parts 70 are formed circumferentially between adjacent outer peripheral retaining parts 58, 58 in the circumference direction, being provided at three locations on the periphery of the movable rubber film 36.

The movable rubber film 36 is housed within the housing recess 42 of the partition member main body 32. Abutting protrusions 44 of the partition member main body 32 abut to the outer peripheral face of the movable rubber film 36, thereby elastically positioning the movable rubber film 36 in the housing recess 42. In addition, the partition member main body 32 and the lid plate member 34 are overlapped in the vertical direction to be fixed, so that the center retaining part 60 and the outer peripheral retaining parts 58 of the movable rubber film 36 are clamped between the lid plate member 34 and the partition member main body 32 from above and below to be elastically supported by the lid plate member 34 and the partition member main body 32. As is clear from the above descriptions, the three reinforcing crosspieces 62, 62, 62 of the movable rubber film 36 are disposed deviate from the lower through holes 48 and the upper through holes 52 in the circumferential direction. Meanwhile, the center retaining part 60 and the outer peripheral retaining parts 58 are positioned deviate from the upper and lower through holes 48, 52 toward the inner circumferential side and toward the outer circumferential side, respectively.

In this embodiment, the outer peripheral retaining parts 58 and the center retaining part 60 both are clamped in the vertical direction between the opposite faces of the partition member main body 32 and the lid plate member 34. Meantime, the reinforcing crosspieces 62 are slightly separate below from the lid plate member 34, forming a gap between the upper faces of the reinforcing crosspieces 62 and the lower face of the lid plate member 34. By making the center retaining part 60 slightly thinner than the outer peripheral retaining parts 58 in the vertical direction, the compression amount between the partition member main body 32 and the lid plate member 34 is made smaller in the center retaining part 60 than in the outer peripheral retaining parts 58. As a result, the dynamic spring constant in the vertical direction is made smaller in the center retaining part 60 than in the outer peripheral retaining parts 58, whereby the center retaining part 60 is made more easily deformable in the vertical direction than the outer peripheral retaining parts 58.

Furthermore, the lower faces of the elastic film parts 68 and the relief film parts 70 are overlapped and held in contact with the bottom wall part of the housing recess 42 of the partition member main body 32. The elastic film parts 68 cover the upper openings of the lower though holes 48, whereby the movable rubber film 36 closes the lower through holes 48. The upper faces of the elastic film parts 68 and the relief film parts 70 are separated below from the lid plate member 34.

The partition member 30 in this structure is housed within the fluid chamber 28. More specifically, the partition member 30 is inserted into the second mounting member 14 until the outer peripheral edge of the upper face thereof touches the large-diameter side edge face of the main rubber elastic body 16. After that, the second mounting member 14 is subjected to a diameter reduction by the means including 360-degree radial compression, so that the partition member 30 is supported by the second mounting member 14. In addition, the outer peripheral edge of the partition member 30 is vertically clamped between the main rubber elastic body 16 and the sealing rubber layer 22, and the fixing member 26 and positioned in the vertical direction.

In this way, the partition member 30 is disposed such that it expands in the axis-perpendicular direction in the fluid chamber 28, whereby the fluid chamber 28 is vertically partitioned by the partition member 30. Specifically, on a first side (the upper side) of the partition member 30, there is provided a pressure-receiving chamber 72 whose wall is partially constituted by the main rubber elastic body 16 which is configured to induce pressure fluctuation upon input of a vibration. On a second side (the lower side) of the partition member 30, there is provided an equilibrium chamber 74 whose wall is partially constituted by the flexible film 24 which is configured to readily generate changes in volume. In the pressure-receiving chamber 72 and the equilibrium chamber 74 partitioned by the partition member 30, the above-described non-compressible fluid is sealed. In this embodiment, the upper through holes 52 of the lid plate member 34 are made to have an amply large opening area and a short length relative to the lower through holes 48 of the partition member main body 32. As a result, the upper through holes 52 and the upper area of the housing recess 42 than the movable rubber film 36 are substantially parts of the pressure-receiving chamber 72.

The outer peripheral face of the partition member 30 is covered in a fluid-tight manner by the second mounting member 14 which is in contact therewith via the sealing rubber layer 22. Accordingly, the circumferential groove 38 opening to the outer peripheral face of the partition member main body 32 is covered in a fluid-tight manner to form a passage in a shape of a tunnel extending a prescribed length in the circumference direction. One end of the passage in a tunnel shape is communicated with the pressure-receiving chamber 72 by the upper opening part 56 of the lid plate member 34. The other end thereof is communicated with the equilibrium chamber 74 by the lower opening part of the partition member main body 32, which is not illustrated. As a result, an orifice passage 76 communicating the pressure-receiving chamber 72 and the equilibrium chamber 74 with each other is formed using the circumferential groove 38. In the orifice passage 76, the tuning frequency which is the resonance frequency of the flowing fluid is preferably set to a low frequency of approximately 5 to 15 Hz. The orifice passage 76 of the present embodiment is, by the means of adjusting the ratio (A/L) of the passage cross sectional area (A) to the passage length (L), tuned to approximately 10 Hz corresponding to engine shake. In the present embodiment, the upper portion of the sealing rubber layer 22, which is thick walled, is pushed and abutted to the outer peripheral face of the partition member 30 upper than the circumferential groove 38, while being pushed and abutted to the lower face in the circumferential groove 38 from above. Thus, the opening of the circumferential groove 38 is covered in a fluid-tight manner to constitute the orifice passage 76.

Furthermore, to the upper face of the movable rubber film 36 assembled to the partition member 30, the liquid pressure of the pressure-receiving chamber 72 is applied via the upper through holes 52. Meantime, to the lower face of the same, the liquid pressure of the equilibrium chamber 74 is applied via the lower through holes 48. This enables the movable rubber film 36 to deform elastically in a vibration input, based on the relative pressure difference between the pressure-receiving chamber 72 and the equilibrium chamber 74. In other words, the pressure-receiving chamber 72 and the equilibrium chamber 74 are in communication with each other through the lower through holes 48 as a communication passage, the housing recess 42 and the upper through holes 52. The openings of the lower through holes 48 are covered and closed by the movable rubber film 36 from the side of the pressure-receiving chamber 72, thereby applying the liquid pressure of each the pressure-receiving chamber 72 and the equilibrium chamber 74 to the respective one of upper and lower faces of the movable rubber film 36. It is also possible to form a communication groove in the upper face of the bottom wall part of the housing recess 42 connecting the lower through holes 48 in order to apply the liquid pressure of the equilibrium chamber 74 to the lower face of the movable rubber film 36 in a wider range.

In the engine mount 10 with this structure, the first mounting member 12 is attached to the power unit, which is not shown, by the fixing bolt 18, while the second mounting member 14 is attached to the vehicle body, which is not shown, thereby the engine mount 10 is mounted to the vehicle. In a state of the engine mount 10 being mounted to the vehicle, the power unit is supported by the vehicle body via the engine mount 10 in a vibration-damping manner.

In this state of the engine mount 10 being mounted to the vehicle, upon input of a low-frequency large-amplitude vibration corresponding to engine shake between the first mounting member 12 and the second mounting member 14, the relative pressure fluctuation between the pressure-receiving chamber 72 and the equilibrium chamber 74 generates a fluid flow through the orifice passage 76. This exerts the target vibration-damping effect (high attenuation effect) based on the flowing action including a resonance action of the fluid.

Moreover, the elastic film parts 68 and the relief film parts 70 of the movable rubber film 36 are reinforced by the retaining parts at the outer rim and the center 58, 60 and the reinforcing crosspieces 62, thereby restricting the elastic deformation amount of the elastic film parts 68 and the relief film parts 70 in the thickness direction. In other words, the substantial free lengths of the elastic film parts 68 and the relief film parts 70 are made small by the retaining parts at the outer rim and the center 58, 60 and the reinforcing crosspieces 62, so that the deformation amount of the movable rubber film 36 is limited. Accordingly, upon input of a low-frequency large-amplitude vibration corresponding to engine shake, the elastic deformation of the elastic film parts 68 and the relief film parts 70 cannot follow it, thereby restricting escaping of the liquid pressure, so that the relative pressure difference between the pressure-receiving chamber 72 and the equilibrium chamber 74 can be obtained largely enough. Consequently, the amount of the fluid flowing through the orifice passage 76 is favorably kept, thereby efficiently obtaining the vibration-damping effect exerted by the fluid flow.

In this embodiment, the reinforcing crosspieces 62 gradually increase their widths toward the outer peripheral side where the movable rubber film 36 has a larger peripheral length. Therefore, the reinforcing effect by the reinforcing crosspieces 62 is exhibited enough even in the outer periphery of the movable rubber film 36, easily limiting the deformation of the movable rubber film 36 upon a low-frequency large-amplitude vibration input. Additionally, the reinforcing crosspieces 62 are provided such that they connect the outer peripheral retaining parts 58 and the center retaining part 60 to each other, and the reinforcing crosspieces 62 are in a both-ends-supported structure to advantageously exert the reinforcing effect of the reinforcing crosspieces 62.

Besides, upon input of a middle-frequency middle-amplitude vibration of approximately 20 to 40 Hz corresponding to idling vibration, the orifice passage 76, which is tuned to a lower frequency than that of the input vibration, is substantially closed by antiresonance. On the other hand, for the elastic film parts 68 of the movable rubber film 36, the liquid pressures of the pressure-receiving chamber 72 and the equilibrium chamber 74 are each applied on the respective face via the upper through holes 52 and the lower through holes 48. Consequently, based on the relative pressure difference between the pressure-receiving chamber 72 and the equilibrium chamber 74, the elastic film parts 68 undergo elastic deformation in the thickness direction. This avoids higher dynamic spring due to the pressure-receiving chamber 72 being substantially sealed to exert the vibration-damping effect owing to low dynamic spring (vibration insulating effect).

Especially when the pressure-receiving chamber 72 is under negative pressure, the elastic film parts 68 and the relief film parts 70 of the movable rubber film 36 are separated from the bottom face of the housing recess 42 to release the obstruction of the lower through holes 48 due to the movable rubber film 36, thereby allowing direct communication between the pressure-receiving chamber 72 and the equilibrium chamber 74. This realizes lower dynamic spring more effectively to exhibit the target vibration-damping effect efficiently. Moreover, in the movable rubber film 36 of the present embodiment, the reinforcing crosspieces 62 are spaced downward from the lower face of the lid plate member 34. It can allow the deformation of the movable rubber film 36 in the thickness direction even in the part where the reinforcing crosspieces 62 are formed, thereby favorably exhibit the liquid pressure absorption action by the elastic deformation of the movable rubber film 36.

Upon a middle-frequency middle-amplitude vibration input, enough liquid pressure absorption action is difficult to attain only by the deformation of the locally provided low-spring area 66, which is described later. However, since the middle-frequency middle-amplitude vibration is an input vibration with a larger amplitude than that of driving rumble with a high frequency, a wide range of the movable rubber film 36 undergoes elastic deformation, to exhibit enough liquid pressure absorption action. In the present embodiment, the widths of the reinforcing crosspieces 62 gradually become smaller toward the inner periphery, whereby, at the inner periphery where the reinforcing crosspieces 62 are disposed densely in the peripheral direction, the peripheral distances between the reinforcing crosspieces 62 are secured. Accordingly, the free lengths of the elastic film parts 68 between the reinforcing crosspieces 62 in the peripheral direction are secured even in the inner periphery to exert the target vibration-damping effect owing to deformation of a wider range of area including the inner periphery of the movable rubber film 36.

Figure 7:
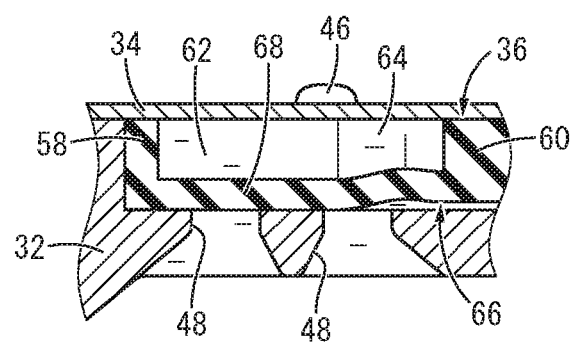
FIG. 7 is a fragmentary enlarged view of a principal part of the engine mount shown in FIG. 1, showing a state upon a high-frequency small-amplitude vibration input.

Besides, upon input of a high-frequency small-amplitude vibration of approximately 50 to 100 Hz corresponding to middle-speed driving rumble, the low-spring area 66 of the movable rubber film 36, which is set by the narrow parts 64 of the reinforcing crosspieces 62, deforms elastically and assertively as shown in FIG. 7. The piston action by the deformation of the low-spring area 66 causes a fluid flow via the lower through holes 48 to eliminate higher dynamic spring due to the pressure-receiving chamber 72 being substantially sealed, thereby exhibit the vibration insulating effect owing to low dynamic spring.

In the engine mount 10 of this embodiment, a high-frequency orifice passage is constituted by the plurality of lower through holes 48. The tuning frequency of the high-frequency orifice passage is set a high frequency of approximately 50 to 100 Hz corresponding middle-speed driving rumble. When the input vibration has a higher frequency than the tuning frequency of the lower through holes 48 like high-speed driving rumble or acceleration rumble, the conventional engine mount may cause notably higher dynamic spring due to antiresonance of the high-frequency orifice passage.

Here, in the engine mount 10 according to the present invention, the narrow parts 64 are formed in the reinforcing crosspieces 62 to provide the low-spring area 66 locally. Upon a high-frequency small-amplitude vibration input, the locally provided low-spring area 66 deforms elastically and preferentially, whereby the piston action, which induces a fluid flow through the lower through holes 48, gets smaller in relation to a case of the movable rubber film 36 deforming as a whole in a wide range. As a result, upon input of a vibration with the frequency to which the lower through holes 48 are tuned, the vibration insulating effect owing to low dynamic spring is effectively exerted. Upon input of a vibration with a higher frequency than the tuning frequency of the lower through holes 48, in the high-frequency orifice passage, the fluid flow amount in resonance is decreased to control higher dynamic spring due to antiresonance, thereby obtaining enough vibration insulating effect.

Especially in this embodiment, the low-spring area 66 owing to the narrow parts 64 is set at the center of the movable rubber film 36 in the radial direction. Accordingly, the low-spring area 66 is set in an area separate from the outer peripheral retaining parts 58 while being elastically supported by the partition member 30 on the center retaining part 60. Therefore, the low-spring area 66 is restrained to a lower extent by the outer peripheral retaining parts 58 to be allowed to deform, while its deformation amount is controlled by the compression spring of the center retaining part 60. It enables to obtain the piston action owing to the deformation of the low-spring area 66 precisely and moderately. As a result, lower dynamic spring is achieved owing to the deformation of the low-spring area 66, while higher dynamic spring due to antiresonance of the lower through holes 48 is favorably decreased or avoided.

In addition, the center retaining part 60 is made thinner in the vertical direction than the outer peripheral retaining parts 58, thereby reducing the compression amount by the partition member 30 in the vertical direction. The resultant center retaining part 60 is more likely to undergo compression deformation in the vertical direction than the outer peripheral retaining parts 58, so that the deformation of the low-spring area 66 is caused enough while being avoided from being excessive. Moreover, the reinforcing crosspieces 62 including the narrow parts 64 are made thinner than the center retaining part 60 and provided with a gap between them and the lid plate member 34. Accordingly, deformation in the vertical direction is enough allowed at the narrow parts 64 to effectively exhibit the vibration-damping effect owing to the deformation of the low-spring area 66.

In the present embodiment, the upper faces of the reinforcing crosspieces 62 are continuous smoothly to the upper faces of the outer peripheral retaining parts 58 and the center retaining part 60. On the other hand, both side faces of the narrow parts 64 are continuous smoothly to both side faces of the reinforcing crosspieces 62. This avoids drastic change in the cross sectional shape of the reinforcing crosspieces 62 in the length direction. Therefore, when the reinforcing crosspieces 62 including the narrow parts 64 undergo elastic deformation, local concentration of stress is avoided and the durability is improved.

The narrow parts 64 are provided in the vicinity of or about the center retaining part 60 where the three reinforcing crosspieces 62, 62, 62 intersect. This sets the low-spring area 66 at the center of the movable rubber film 36 where the three reinforcing crosspieces 62, 62, 62 are likely to exert the reinforcing effect greatly. Like this, the low-spring area 66 is provided in a part of the movable rubber film 36 where the deformation rigidity is likely to be large by the reinforcing effect of the reinforcing crosspieces 62. This makes the deformation rigidity of the low-spring area 66 easy to tune precisely without tuning it excessively small, avoiding excessive elastic deformation of the low-spring area 66.

Besides, since the peripheral width dimensions of the narrow parts 64 are made smaller than those of the other parts of the reinforcing crosspieces 62, the effect of the dimension change on the bending deformation rigidity in the thickness direction of the reinforcing crosspieces 62 is reduced relative to a case of the thickness dimensions of the reinforcing crosspieces 62 being made partially small. Accordingly, the spring in the bending direction of the reinforcing crosspieces 62 is avoided from changing delicately, depending on the cross sectional shape change of the reinforcing crosspieces 62 in the narrow parts 64. As a result, the spring characteristics of the low-spring area 66 can be tuned easily with high precision.

Figure 8:
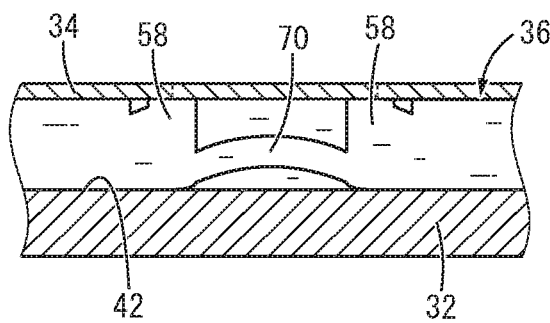
FIG. 8 is a fragmentary enlarged view of the engine mount shown in FIG. 1, showing a state upon a large load input.

Upon an impactful large load input, the fluid flow through the orifice passage 76 may not be able to follow it completely, possibly leading to the pressure of the pressure-receiving chamber 72 decreasing locally and notably. Generally in such a situation, strange noise due to cavitation may be generated. However, in the engine mount 10, generation of cavitation is also avoided. Specifically, when the pressure of the pressure-receiving chamber 72 gets greatly lower, the elastic film parts 68 and the relief film parts 70 of the movable rubber film 36 undergo elastic deformation as shown in FIG. 8 to release obstruction of the lower through holes 48 due to the movable rubber film 36, changing the lower through holes 48 into a communication state. This communicates the pressure-receiving chamber 72 and the equilibrium chamber 74 with each other via the upper and lower through holes 52 and 48 and the housing recess 42 to decrease or dispel the negative pressure of the pressure-receiving chamber 72 as rapidly as possible. This avoids generation of cavitation bubbles, and strange noise which is generated when the cavitation bubbles vanishes, as a result. In the lid plate member 34, the relief holes 54 are formed therethrough on the radial outside of the movable rubber film 36. Accordingly, even if the movable rubber film 36 deforms elastically and greatly toward the pressure-receiving chamber 72, the communication state of the pressure-receiving chamber 72 and the equilibrium chamber 74 is kept through the lower through holes 48 and the relief holes 54 to avoid cavitation.

Figure 9:
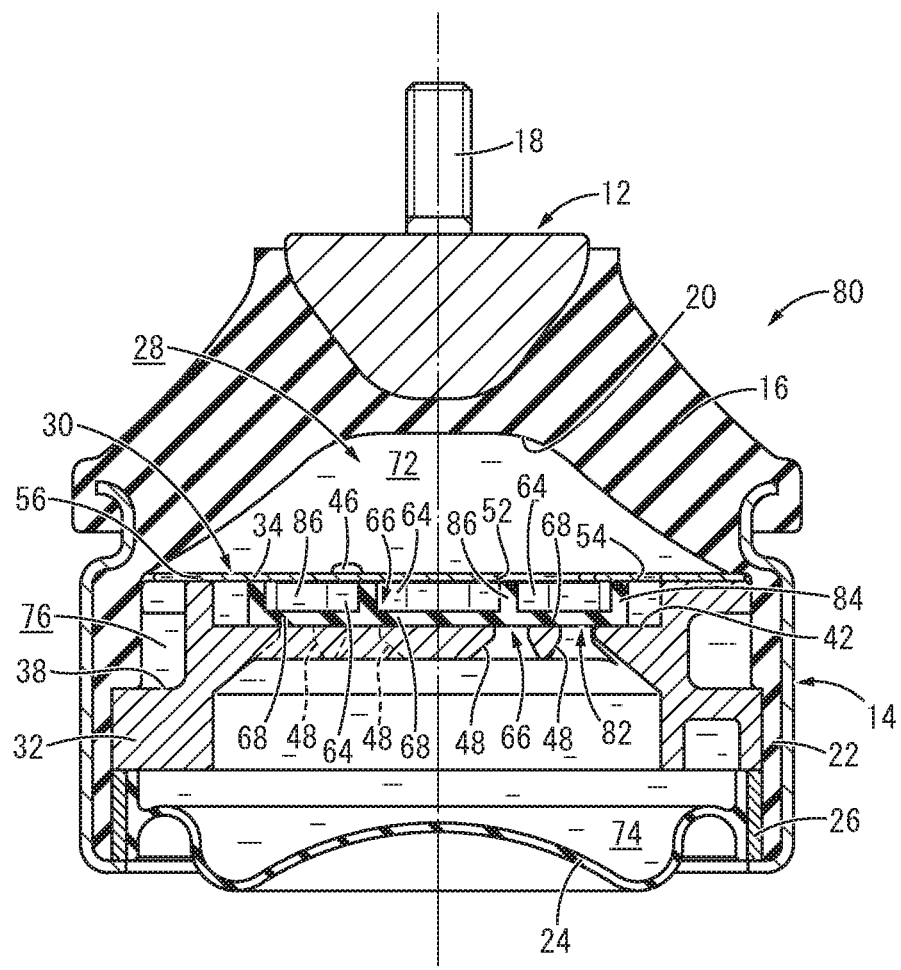
FIG. 9 is a vertical cross sectional view showing a fluid-filled vibration-damping device in the form of an engine mount as a second embodiment of the present invention.
Figure 10:
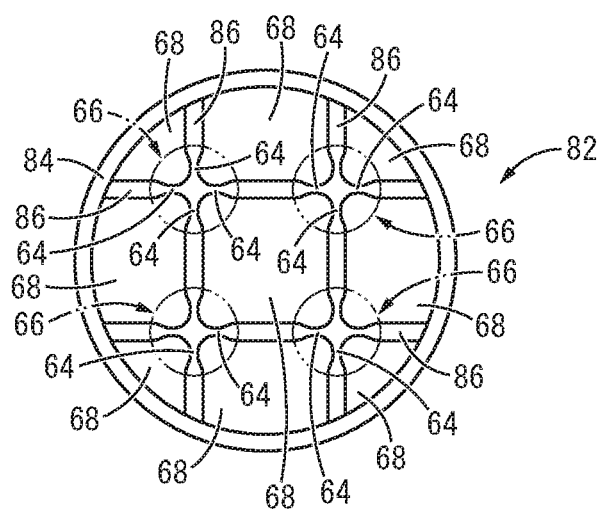
FIG. 10 is a plan view of a movable rubber film of the engine mount shown in FIG. 9.

Moreover, FIG. 9 shows an engine mount 80 as a second embodiment of the fluid-filled vibration-damping device according to the present invention. The engine mount 80 has a movable rubber film 82 as shown in FIG. 10 instead of the movable rubber film 36 of the first embodiment. In the following descriptions, for parts and members that are essentially the same as those of the first embodiment, the same numbering has been used in the diagram and separate explanations have been omitted.

More specifically, the movable rubber film 82 has a substantially circular disc shape. It includes an outer peripheral retaining part 84 in an annular shape, which extends in the peripheral direction and be continuous across all the periphery, at its outer rim and a plurality of reinforcing crosspieces 86, which extend inward from the outer peripheral retaining part 84. The outer peripheral retaining part 84 can comprise a plurality of parts peripherally separate to each other as the first embodiment.

The reinforcing crosspieces 86 have shapes which extend linearly and protrude upward in the thickness direction of the movable rubber film 82. Besides, the plurality of reinforcing crosspieces 86 comprises four reinforcing crosspieces 86, 86, 86, 86. Two of them are disposed approximately parallel to each other to be one set, and so do the other two. The two sets extend in the directions which are approximately orthogonal to each other set. In short, the four reinforcing crosspieces 86, 86, 86, 86 are disposed such that they intersect in a lattice pattern with both ends connecting to the outer peripheral retaining part 84.

In the vicinity of the intersection part of the reinforcing crosspieces 86, the narrow parts 64 are provided. Each reinforcing crosspiece 86 has two intersection parts and the narrow parts 64 are formed on both sides of each intersection part, whereby each reinforcing crosspiece 86 is provided with four narrow parts 64, 64, 64, 64. As a result, in the vicinity of each intersection part of the reinforcing crosspieces 86, the low-spring area 66 is set by the narrow parts 64. In the first embodiment, the movable rubber film has only one low-spring area 66 set at the center, while, in the present embodiment, a plurality of low-spring areas 66 are provided dispersedly on the face of the movable rubber film 82.

Even in a case of having a plurality of intersection parts like this embodiment, there is no need to set the low-spring area 66 for each intersection part, and it is possible to set the low-spring area 66 only in the vicinity of one intersection part or plural ones in selection. As apparent from this, it is not necessary to provide the narrow parts 64 for all of the reinforcing crosspieces 86, as long as the narrow part 64 is provided for at least one reinforcing crosspiece 86. Furthermore, it is also possible to provide the narrow parts 64 only on one of two sides of the intersection parts in the reinforcing crosspieces 86.

The movable rubber film 82 is housed in the housing recess 42 of the partition member main body 32 with the outer peripheral face being abutted to the abutting protrusions 44 of the partition member main body 32 and the outer peripheral retaining part 84 being vertically clamped between the partition member main body 32 and the lid plate member 34. In this way, the movable rubber film 82 is mounted to the partition member 30. The movable rubber film 82 of the present embodiment does not be provided with the center retaining part 60 of the first embodiment, so that the outer rim with the outer peripheral retaining part 84 is vertically clamped by the partition member 30 while the whole part which is on the inner peripheral side of the outer peripheral retaining part 84 is separated below from the lid plate member 34. In short, in a state of the movable rubber film 82 being disposed in the partition member 30, the intersection parts of this embodiment do not be vertically clamped by the partition member 30 as the center retaining part 60 of the first embodiment, but the upper faces of the intersection parts are spaced downward from the lid plate member 34. It is possible to make the intersection parts project upward from the reinforcing crosspieces 86 so that the intersection parts get clamped in the vertical direction by the partition member 30.

When adopting the movable rubber film 82 provided with the reinforcing crosspieces 86 which are disposed in a lattice pattern this way, as well as the first embodiment, an effective vibration-damping action is obtained in relation to all the plural kinds of vibrations with various frequencies, especially in relation to vibrations in a wide range of high frequency. The shapes of the reinforcing crosspieces 86 and the elastic film parts 68 of the movable rubber film 82 are different from those according to the first embodiment. Therefore, the upper through holes 52 and the lower through holes 48 of the partition member 30 can be changed as appropriate in shape, number, position etc., depending on those of the reinforcing crosspieces 86 and the elastic film parts 68.

The embodiments of the present invention have been described above. However, this invention is not limited by the specific descriptions. For example, the movable rubber film 36 is not limited to a circular disc shape, and one whose shape is substantially a polygonal plate such as a square plate can be used, for example.

Also, to the movable rubber film 36, a reinforcing member such as a metal plate can be attached for the purpose of reinforcement. In this case, it is desirable that the reinforcing member be provided at a part out of the low-spring area 66 in order to make the deformation of the low-spring area 66 easily allowable.

None of the outer peripheral retaining parts 58, the center retaining part 60 and the reinforcing crosspieces 62 is limited to a structure wherein it protrudes only to one side of the thickness direction of the movable rubber film 36. A structure wherein it protrudes to both sides of the thickness direction can be adopted.

The number of the reinforcing crosspieces 62 is not especially limited as long as it is plurality. Additionally, the reinforcing crosspieces 62 are not limited to straight line shapes, and they can bend as a whole or partially in the middle. Furthermore, although it is desirable that the cross sectional shapes of the reinforcing crosspieces 62 change continuously in the length direction, the cross sectional shapes can change discontinuously, like a case of changing drastically at both ends in the length direction of the narrow parts 64, for example.

Moreover, the reinforcing crosspieces 62 can have their upper faces be attached to the lower face of the lid plate member 34. They can be compressed and clamped in the vertical direction between the lid plate member 34 and the partition member main body 32.

Also, the lengths of the narrow parts 64 in the reinforcing crosspieces 62, or a range of the low-spring area 66 in other words, can be set as appropriate depending on the required characteristics.

Besides, in the aforementioned embodiment, the communication passage comprises the lower through holes 48 provided on the side of the equilibrium chamber 74 in relation to the movable rubber film 36. Actually, it is possible that the upper through holes 52 which are provided on the side of the pressure-receiving chamber 72 are made to be a communication passage tuned to middle-speed driving rumble, for example. It is also possible that the communication passage comprises all the upper through holes 52, the space in the housing recess 42, and the lower through holes 48 which are in communication. In short, the movable rubber film 36 can be disposed on either of outsides in the length direction of the communication passage, or in the middle in the length direction of the passage.

In the above-described embodiment, an example of applying the fluid-filled vibration-damping device according to the present invention for an engine mount is shown. In fact, this invention can be used for a sub-frame mount, a differential mount, or a body mount for example. Additionally, the application range of the present invention is not limited to usage for automobiles. It can be preferably applied for fluid-filled vibration-damping devices used in motorcycles, rail vehicles, industrial vehicles, and the like.

What is claimed is:

1. A fluid-filled vibration-damping device comprising:
a first mounting member;
a second mounting member;
a main rubber elastic body elastically connecting the first mounting member and the second mounting member;
a partition member supported by the second mounting member;
a pressure-receiving chamber whose wall is partially constituted by the main rubber elastic body and disposed on a first side of the partition member;
an equilibrium chamber whose wall is partially constituted by a flexible film and disposed on a second side of the partition member;
a non-compressible fluid sealed in the pressure-receiving chamber and the equilibrium chamber;
an orifice passage communicating the pressure-receiving chamber and the equilibrium chamber with each other;
a communication passage provided at the partition member to communicate the pressure-receiving chamber and the equilibrium chamber with each other; and
a movable rubber film being disposed in the communication passage so that a pressure of the pressure-receiving chamber is applied to a first face of the movable rubber film and a pressure of the equilibrium chamber is applied to a second face of the movable rubber film,
wherein the movable rubber film includes: (i) an outer peripheral retaining part having a thick wall that is formed at an outer rim of the movable rubber film and that is clamped by the partition member, and (ii) a plurality of reinforcing crosspieces projecting on a face of the movable rubber film and extending radially inward from the outer peripheral retaining part,
the plurality of reinforcing crosspieces mutually intersect at radially inner edges to provide an intersection part, and a width dimension of at least one of the reinforcing crosspieces is made smaller at a radially inner portion of the one reinforcing crosspiece than at a radially central portion and a radially outer portion of the one reinforcing crosspiece so as to provide a narrow part so that the movable rubber film has a low-spring area in a vicinity of the intersection part of the reinforcing crosspieces by the narrow part,
the movable rubber film further includes a center retaining part having a thick wall, while the plurality of reinforcing crosspieces connect the center retaining part and the outer peripheral retaining part to each other so that the plurality of reinforcing crosspieces intersect together at the center retaining part as the intersection part, and each of the reinforcing crosspieces has the narrow part at an end portion of the reinforcing crosspieces on a side of the center retaining part,
the center retaining part is made thinner in a vertical direction than the outer peripheral retaining part and is made thicker in the vertical direction than the reinforcing crosspieces, and
the outer peripheral retaining part and the center retaining part both are clamped in the vertical direction by the partition member and the reinforcing crosspieces are separate from the partition member.

2. The fluid-filled vibration-damping device according to claim 1, wherein each of the reinforcing crosspieces extends with a straight line shape, and the plurality of reinforcing crosspieces extend outward from the center retaining part in a radial fashion to connect to the outer peripheral retaining part.

3. The fluid-filled vibration-damping device according to claim 1, wherein each of the reinforcing crosspieces gradually reduces a width from the outer peripheral retaining part to a radially inner edge, respectively.

4. The fluid-filled vibration-damping device according to claim 1, wherein a gap is formed between a projecting edge face of each of the reinforcing crosspieces from the movable rubber film and the partition member.

\* \* \* \* \*